United States Patent
Konishi et al.

(10) Patent No.: US 9,566,855 B2
(45) Date of Patent: Feb. 14, 2017

(54) HEAD COVER STRUCTURE OF ENGINE AND SUSPENSION STRUCTURE THEREOF

(71) Applicant: HONDA MOTOR CO., LTD., Tokyo (JP)

(72) Inventors: Yukio Konishi, Saitama (JP); Hirotaka Ogino, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 14/535,804

(22) Filed: Nov. 7, 2014

(65) Prior Publication Data

US 2015/0129331 A1 May 14, 2015

(30) Foreign Application Priority Data

Nov. 8, 2013 (JP) ................... 2013-232027
Nov. 8, 2013 (JP) ................... 2013-232419

(51) Int. Cl.
*B60K 5/12* (2006.01)
*F02F 7/00* (2006.01)

(52) U.S. Cl.
CPC .............. *B60K 5/12* (2013.01); *F02F 7/006* (2013.01); *F02F 7/0012* (2013.01); *F02F 7/0073* (2013.01); *B60K 5/1216* (2013.01)

(58) Field of Classification Search
CPC .......... B60K 5/12; B60K 5/1216; F02F 7/006; F02F 7/0012; F02F 7/0073; F02F 2007/0075
See application file for complete search history.

(56) References Cited

U.S. PATENT DOCUMENTS

| | | | | | |
|---|---|---|---|---|---|
| 1,637,604 | A | * | 8/1927 | Clark | B60K 5/12 180/300 |
| 2,020,597 | A | * | 11/1935 | Appel | B60K 5/1216 180/291 |
| 3,402,782 | A | * | 9/1968 | Ljungstrom | B60K 5/1216 180/292 |

(Continued)

FOREIGN PATENT DOCUMENTS

| | | |
|---|---|---|
| JP | 06-313463 A | 11/1994 |
| JP | 07-032914 A | 7/1995 |

(Continued)

*Primary Examiner* — Frank Vanaman
(74) *Attorney, Agent, or Firm* — Westerman, Hattori, Daniels & Adrian, LLP

(57) ABSTRACT

Provided is a head cover structure of an engine, which is capable of increasing supporting rigidity of a head cover. The engine includes a driving force transmission mechanism for transmitting a driving force of a crankshaft to a valve train, in which the head cover includes a bulging portion for covering an upper side of the driving force transmission mechanism on one end side thereof in a cylinder row direction, and an engine mounting portion is attached to the bulging portion. The bulging portion is provided with an inclined surface portion having an inclined surface inclined downwardly toward the other end side in the cylinder row direction, and the inclined surface is formed to rise upwardly from an intermediate position in the cylinder row direction so as to be continuous with a top surface of the bulging portion on the one end side in the cylinder row direction.

6 Claims, 12 Drawing Sheets

(56) References Cited

U.S. PATENT DOCUMENTS

| | | | | |
|---|---|---|---|---|
| 4,881,712 A | * | 11/1989 | Lun | F16F 13/08 248/636 |
| 4,993,375 A | * | 2/1991 | Akihiko | F01M 13/0416 123/195 C |
| 5,127,607 A | * | 7/1992 | McGuire | B60K 5/1216 244/54 |
| 2002/0096384 A1 | * | 7/2002 | Yoshida | B60K 5/12 180/298 |
| 2002/0185094 A1 | * | 12/2002 | Yoon | F01L 1/053 123/90.38 |
| 2004/0149250 A1 | * | 8/2004 | Gschwindt | F01L 1/02 123/195 C |
| 2005/0223786 A1 | * | 10/2005 | Akkerman | B60K 5/1216 73/117.01 |
| 2008/0105227 A1 | * | 5/2008 | Matsuura | F02F 7/0073 123/90.15 |
| 2012/0125283 A1 | * | 5/2012 | Russo | F02F 7/0073 123/195 C |

FOREIGN PATENT DOCUMENTS

| | | | |
|---|---|---|---|
| JP | 2758478 | B2 | 5/1998 |
| JP | 3018867 | B2 | 3/2000 |
| JP | 4556921 | B2 | 10/2010 |

* cited by examiner

HEAD COVER STRUCTURE OF ENGINE AND SUSPENSION STRUCTURE THEREOF

CROSS REFERENCE TO RELATED APPLICATIONS

This application claims the foreign priority benefit under Title 35, United States Code, 119(a)-(d) of Japanese Patent Application No. 2013-232419 filed on Nov. 8, 2013 and Japanese Patent Application No. 2013-232027 filed on Nov. 8, 2013 in the Japan Patent Office, each disclosure of which is herein incorporated by reference in its entirety.

BACKGROUND OF THE INVENTION

1. Field of the Invention

The present invention relates to a head cover structure of an engine and a suspension structure of the engine which is, for example, mounted on an automobile or the like.

2. Description of the Related Art

In general, when mounting an engine on a vehicle, various optimum mounting arrangements in an up-down direction, a left-right direction, and a front-rear direction of a vehicle have been investigated in order to mount the engine in a stable manner. For example, it is well known that engine mounts (mounting members) for supporting an upper side and a lower side of the engine are configured to be arranged spaced from each other in a front-rear direction of the engine (for example, see Japanese Unexamined Patent Application Publication No. H06-313463 and Japanese Patent No. 3018867). In this case, it is known that it is possible to support the engine in a stable manner during travel of the vehicle in a case where the mounting members are separated from each other as much as possible in the up-down direction, in the left-right direction, and in the front-rear direction.

In order to mount the engine in a stable manner, for example, it is considered that a mounting member is mounted on a component disposed on an upper portion of the engine. However, a head cover constituting the upper portion of the engine is a rectangular component made of a thin plate member with a hollow inside thereof, and is vulnerable to a load in the up-down direction. Therefore, in order to support the engine which is a heavy object by the head cover, reinforcement such as forming a thick wall of the head cover is required, but there is a possibility to increase a weight of the engine if the wall of the head cover is reinforced to be thick.

Therefore, there is known a structure of mounting a mounting bracket on a timing chain cover, which is the same cover member as the head cover but has a fastening direction different from that of the head cover, and is able to be fastened to an engine body such as a cylinder block together with the head cover.

For example, in Japanese Patent No. 2758478, the timing chain cover (timing cover) is configured to be divided into three of a head cover portion, a cylinder head portion, and a cylinder body portion, and a stay is fixed to a side wall of the head cover portion constituting the timing chain cover. In Japanese Patent No. 2758478, a suspension structure of the engine, in which the head cover of the engine is fixed to a strut tower via the stay, is employed.

Further, Japanese Patent No. 4556921 discloses that on an upper surface of an upper extension portion of the timing chain cover (timing cover), a mounting bracket mounting seat, on which the mounting bracket for mounting the engine is mounted, is provided.

Furthermore, Japanese Examined Utility Model Application Publication No. H07-032914 discloses a cover structure of a V-type engine, in which a pair of banks (bank cylinders) is arranged in a V-shape. In the cover structure of the V-type engine which is disclosed in Japanese Examined Utility Model Application Publication No. H07-032914, three covers are configured to be individually separated from one another. The three covers are composed of a cover for covering a front surface which is provided with a timing train of the cylinder block, a cover for covering a front surface of the cylinder head, and a head cover for covering an upper portion of the cylinder head.

SUMMARY OF THE INVENTION

However, at the present time, it seems not to have reached a proposal of an engine mount mounting structure suitable for harmonizing both a mounting rigidity and an optimum mounting position. Therefore, when mounting an engine mount for supporting the engine on the head cover so as to be different from a structure in which the stay or the mounting bracket is mounted on the timing chain cover (timing cover) as described in Japanese Patent No. 2758478 and Japanese Patent No. 4556921, a mounting load is inputted to the head cover from the engine mount. For this reason, it is required a head cover structure with a high rigidity (supporting rigidity) capable of supporting a mount input load corresponding to the weight of the engine, while allowing the engine mount to be mounted on the head cover.

Further, when the head cover is provided with the engine mount for supporting the engine, a load is transmitted to the head cover side from the engine mount. In this case, for example, when allowing mating surfaces of the cylinder head and the head cover of the engine to overlap with a border line of a cover for covering front surfaces of the cylinder head and the head cover, a force is applied in a direction separating the mating surfaces from each other by a load inputted to the mating surfaces. As a result, there is a possibility that the mating surfaces to be essentially firmly coupled to each other are open and a gap is generated between the mating surfaces.

A general object of the present invention is to provide a head cover structure of the engine, which is capable of increasing supporting rigidity of the head cover. A main object of the present invention is to provide an engine cover mounting structure capable of firmly coupling mating surfaces of components constituting the engine. Another object of the present invention is to provide a suspension structure of the engine, which is capable of increasing the supporting rigidity of the head cover.

In order to achieve the above objects, the present invention is a head cover structure of an engine in which an engine mounting portion for suspending the engine on a vehicle body frame is attached to an upper surface of a head cover for covering a valve train, wherein the engine includes a driving force transmission mechanism for transmitting a driving force of a crankshaft to the valve train on one end side in a cylinder row direction, wherein on the one end side in the cylinder row direction of the head cover, a bulging portion for covering an upper side of the driving force transmission mechanism is provided, wherein the engine mounting portion is attached to the bulging portion, wherein the bulging portion is provided with an inclined surface portion having an inclined surface which is inclined downwardly toward the other end side in the cylinder row direction, and wherein the inclined surface is formed to rise upwardly from an intermediate position in the cylinder row direction so as to be continuous with a top surface of the bulging portion on the one end side in the cylinder row direction.

When the engine mounting portion for supporting the engine is attached to the head cover, a vibration during travel of the vehicle, a centrifugal force during turning, a load in a front-rear direction during acceleration or deceleration, and the like are inputted to the head cover from the engine mounting portion. In comparison with a conventional head cover of simple rectangular shape, in the present invention, since the engine mounting portion is attached to the bulging portion projecting to cover the driving force transmission mechanism, a rigidity of the bulging portion is relatively high without thickening the head cover, and further by forming the inclined surface so as to be continuous with the bulging portion, a height dimension is gradually increased toward the one end side in the cylinder row direction owing to the inclined surface. Therefore, in the present invention, the entire inclined surface functions as a rib (rigid rib). Furthermore, in the present invention, by configuring the inclined surface as a surface rather than a simple rib, it is possible to increase the rigidity evenly not only in the up-down direction but also in the left-right direction, as well as against the centrifugal force, thereby supporting the engine in a stable manner while suppressing an increase in engine weight.

Further, the present invention is characterized in that the head cover is formed with a first rib extending in the cylinder row direction, and one end side of the first rib is continuous with the bulging portion.

According to the present invention, by providing the first rib extending in the cylinder row direction on the bulging portion to which a mount input load is inputted, it is possible to further increase rigidity of the head cover, thereby supporting the engine in a stable manner by suppressing deformation of the head cover.

Further, the present invention is characterized in that an opening portion is formed on a side wall on the one end side in the cylinder row direction of the bulging portion, wherein a cover member for closing the opening portion is provided, wherein a part of the cover member is fastened to the head cover, and the remainder of the cover member is fastened to a cylinder head, wherein the bulging portion of the head cover is provided with a first fastening portion for fastening the engine mounting portion to the head cover, wherein the bulging portion of the head cover is further provided with a second fastening portion for fastening the cover member to the head cover, and wherein a fastening direction of the first fastening portion and a fastening direction of the second fastening portion are substantially perpendicular to each other.

According to the present invention, by substantially orthogonalizing the fastening direction of the first fastening portion for fastening the engine mounting portion to the head cover with respect to the fastening direction of the second fastening portion for fastening the cover member to the head cover, and by providing the second fastening portion in proximity to the first fastening portion of the bulging portion, so that a fastening boss portion of the cover member is configured around the first fastening portion, it is possible to partially thicken the head cover. As a result, the rigidity of the head cover around the first fastening portion is increased, and further by forming a fastening boss portion of the first fastening portion and a fastening boss portion of the second fastening portion so as to be substantially perpendicular to each other, the rigidity around the first fastening portion is increased not only in one direction but also in multiple directions. Therefore, it is possible to sufficiently increase the rigidity against a load in multiple directions which is inputted from the engine mounting portion, while suppressing the increase in the engine weight.

Further, the present invention is characterized in that the cover member includes a head cover covering portion which is fastened to the head cover, and a cylinder head covering portion which is fastened to the cylinder head, and the cover member is fastened across mating surfaces of the cylinder head and the head cover.

When the engine mounting portion is attached to the head cover, by the load (mount input load) which is inputted from the engine mounting portion, a force to separate the mating surfaces (coupling surfaces) of the cylinder head and the head cover from each other is generated. According to the present invention, when the mount input load is applied to the mating surfaces of the cylinder head and the head cover, since the cover member for covering both the cylinder head and the head cover across the mating surfaces thereof serves as a rigid member, it is possible to suitably avoid that the mating surfaces of the cylinder head and the head cover open a mouth to generate a gap between the mating surfaces.

In other words, since the cover member is fastened across the mating surfaces of the cylinder head and the head cover, a force to couple together the mating surfaces of the cylinder head and the head cover is applied, so that a coupling state of the mating surfaces can be firmly held.

Further, the present invention is characterized in that a plurality of first fastening members which are fastened to the first fastening portion are provided apart from each other in a direction intersecting the cylinder row direction, and at least one second fastening member which is fastened to the second fastening portion is located in a range between axis lines of the first fastening members adjacent to each other.

According to the present invention, when the mount input load is applied in the range between axis lines of the first fastening members adjacent to each other, since at least one second fastening member for fastening the cover member is provided in the range, by the fastening boss portion for the first fastening member and the fastening boss portion for the second fastening member, it is possible to increase the rigidity by locally (partially) thickening a thickness of a portion to which the mount input load is inputted. Therefore, it is possible to suppress deformation of the head cover, thereby supporting the engine in a stable manner.

Further, the present invention is characterized in that the head cover is formed with at least two openings for inserting members which are held through the head cover, and the head cover is provided with a second rib for coupling at least the two openings in the cylinder row direction.

According to the present invention, even in a case where the head cover is formed with at least two openings for inserting members which are held through the head cover, the second rib for coupling the two openings in the cylinder row direction prevents decrease of the rigidity, so that a desired rigidity can be ensured.

Further, the present invention is characterized in that the bulging portion is formed with a through-hole through which an oil control valve is inserted, and on one end portion in the cylinder row direction of the bulging portion, a boss portion for fastening the first fastening member and/or the second fastening member is formed to bulge out inside the head cover, and further on an inner surface of the head cover, a third rib for coupling the boss portion and a peripheral edge portion of the through-hole is provided.

According to the present invention, even in a case where the bulging portion for supporting the engine mounting portion is formed with the through-hole through which the oil control valve is inserted, the third rib for coupling the boss portion and the peripheral edge portion of the through-hole prevents decrease of the rigidity, so that the desired rigidity can be ensured.

Further, the present invention is characterized in that an engine cover mounting structure includes a cylinder head of an engine, a head cover which is provided on an upper portion of the cylinder head, an engine mounting portion which is provided on the head cover and supports the engine, and a cover member which is provided across both the cylinder head and the head cover.

When the engine mounting portion is attached to the head cover, by the load (mount input load) which is inputted from the engine mounting portion, a force to separate the mating surfaces (coupling surfaces) of the cylinder head and the head cover from each other is generated. However, according to the present invention, since the cover member is provided across both the cylinder head and the head cover, the force to couple together the mating surfaces of the cylinder head and the head cover is applied, so that the coupling state of the mating surfaces can be firmly held.

As a result, in the present invention, when the mount input load is applied to the mating surfaces of the head cover and the cylinder head, since the cover member which is provided across both the cylinder head and the head cover serves as the rigid member, it is possible to suitably avoid that the mating surfaces of components constituting the engine open a mouth to generate the gap between the mating surfaces.

Further, the present invention is characterized in that a mounting surface for mounting the cover member on the head cover and the cylinder head is perpendicular to mating surfaces of the head cover and the cylinder head, and the cover member has a width dimension substantially equal to a full width of the mating surfaces located at a front end portion in the cylinder row direction, and further on upper and lower positions of one end and the other end of the mating surfaces located at the front end portion in the cylinder row direction, fastening points for fastening the cover member to the cylinder head and the head cover are respectively provided.

According to the present invention, the mounting surface for mounting the cover member on the head cover and the cylinder head is perpendicular to the mating surfaces of the head cover and the cylinder head. By doing so, the mounting surface can be in a direction parallel to the mount input load (a direction along the mount input load), thereby suppressing an opening of the gap between the cylinder head and the head cover. Moreover, by mounting the cover member from a direction which is perpendicular to an opening direction of the mating surfaces, a mounting workability can be improved.

Further, according to the present invention, since the cover member has the width dimension substantially equal to the full width of the mating surfaces located at the front end portion in the cylinder row direction, it is possible to cover the mating surfaces (full width of the mating surfaces) from one end to the other end in the width direction thereof, thereby suppressing an opening of the mating surfaces in a substantially full range thereof. Further, since the cover member has the width dimension substantially equal to the full width of the mating surfaces, it is possible to allow separation (dispersion) of the fastening points for preventing the opening by the cover member, to firmly fix the cover member to the mounting surfaces of the cylinder head and the head cover, thereby suppressing the opening of the mating surfaces.

Furthermore, according to the present invention, on upper and lower positions of one end and the other end of the mating surfaces located at the front end portion in the cylinder row direction, the fastening points for fastening the cover member to the cylinder head and the head cover are respectively provided, and thus it is possible to firmly fix the cover member across the full width of the mating surfaces which have a possibility of opening.

Further, the present invention is characterized in that fastening bolts for fixing the engine mounting portion to the head cover are provided, and the cover member has an edge which is substantially parallel to an axial direction of the fastening bolts.

According to the present invention, since the cover member has the edge which is substantially parallel to an input direction of the mount input load from the engine mounting portion, it is possible to increase a holding force of the mating surfaces by the cover member.

Further, the present invention is characterized in that a lower portion of the cylinder head is coupled to a cylinder block via mating surfaces, and a lower end of the cover member in a cylinder axis direction is located higher than the mating surfaces of the cylinder block and the cylinder head.

According to the present invention, since the lower portion of the cylinder head is coupled to the cylinder block via the mating surfaces, it is possible to increase the rigidity of the cylinder head. By increasing the rigidity of the cylinder head, it is possible to suppress deformation of the cylinder block even when the mount input load is inputted to the cylinder block.

Further, according to the present invention, since the lower end of the cover member is located higher than the mating surfaces of the cylinder block and the cylinder head, and does not cover a front surface of the cylinder block, it is possible to improve a joining accuracy between the cylinder head and the head cover, thereby increasing a coupling strength therebetween.

Furthermore, the present invention is a suspension structure of a longitudinal V-type engine which is mounted on a vehicle frame so that a cylinder row is located in a vehicle front-rear direction, wherein a driving force transmission mechanism for transmitting a driving force of a crankshaft to a valve train is provided so as to be located on a front side in the vehicle front-rear direction, wherein a first engine mounting portion is fastened to an upper surface of a head cover for covering the valve train of each bank, wherein a second engine mounting portion is fastened to a transmission which is mounted on a rear side in the vehicle front-rear direction of the engine, and wherein the first engine mounting portion on the front side provided on the head cover and the second engine mounting portion on the rear side provided on the transmission are mounted so as to be located on a principal axis of inertia of the engine.

According to the present invention, since the first engine mounting portion on the front side provided on the head cover and the second engine mounting portion on the rear side provided on the transmission are mounted so as to be located on the principal axis of inertia of the engine, it is possible to not only suppress a vibration when starting the engine, but also to improve a driving stability, even in the engine such as the V-type engine having the cylinder head with a relatively large weight.

According to the present invention, it is possible to obtain a head cover structure of an engine, which is capable of increasing supporting rigidity of a head cover. Further, according to the present invention, it is possible to obtain an engine cover mounting structure capable of firmly coupling mating surfaces of components constituting the engine. Furthermore, according to the present invention, it is possible to obtain a suspension structure of the engine, which is capable of increasing the supporting rigidity of the head cover.

DETAILED DESCRIPTION OF THE INVENTION

Figure 1:
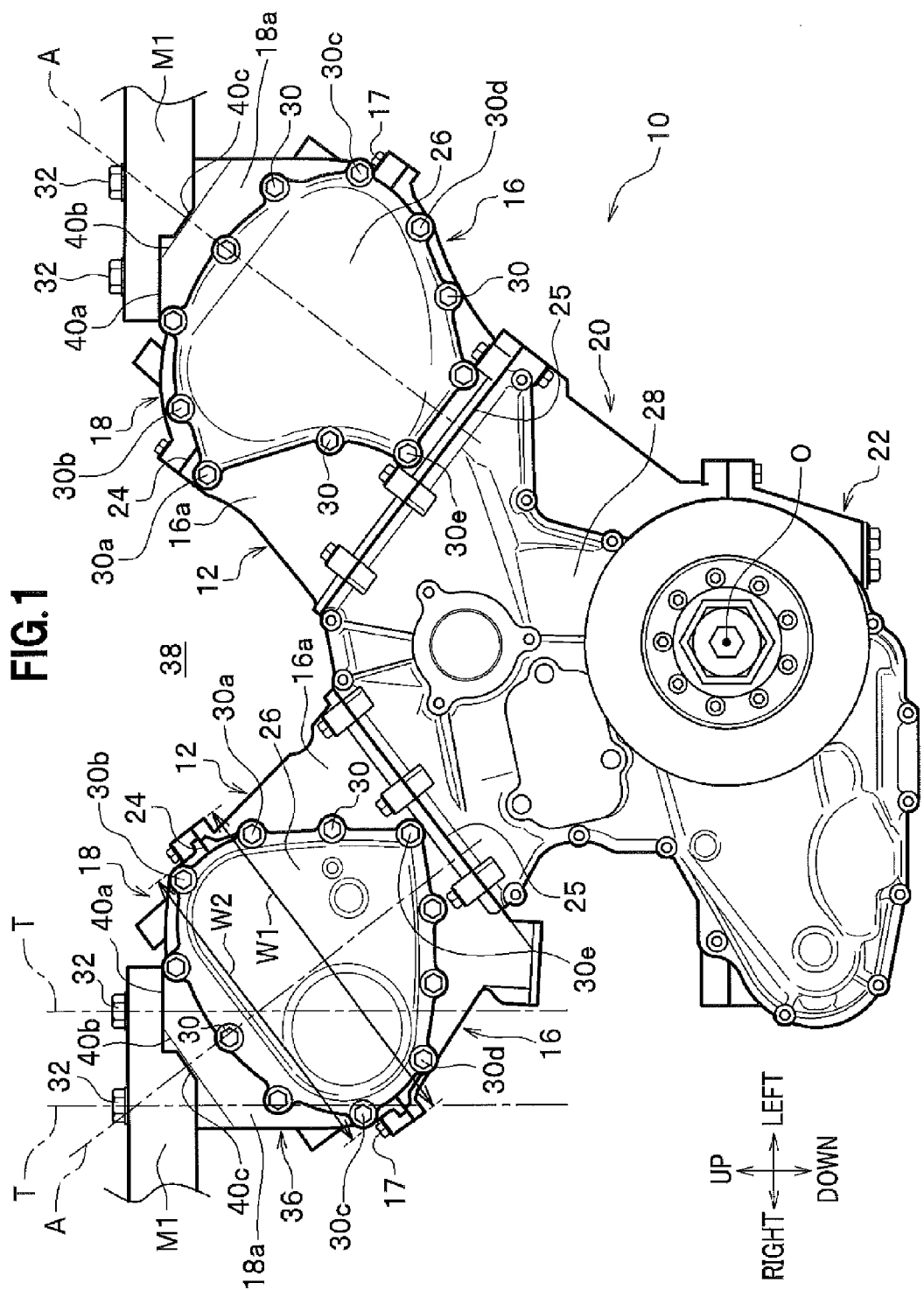
FIG. 1 is a front view of a V-type engine which is applied with a head cover structure and a cover mounting structure according to an embodiment of the present invention.
Figure 3:
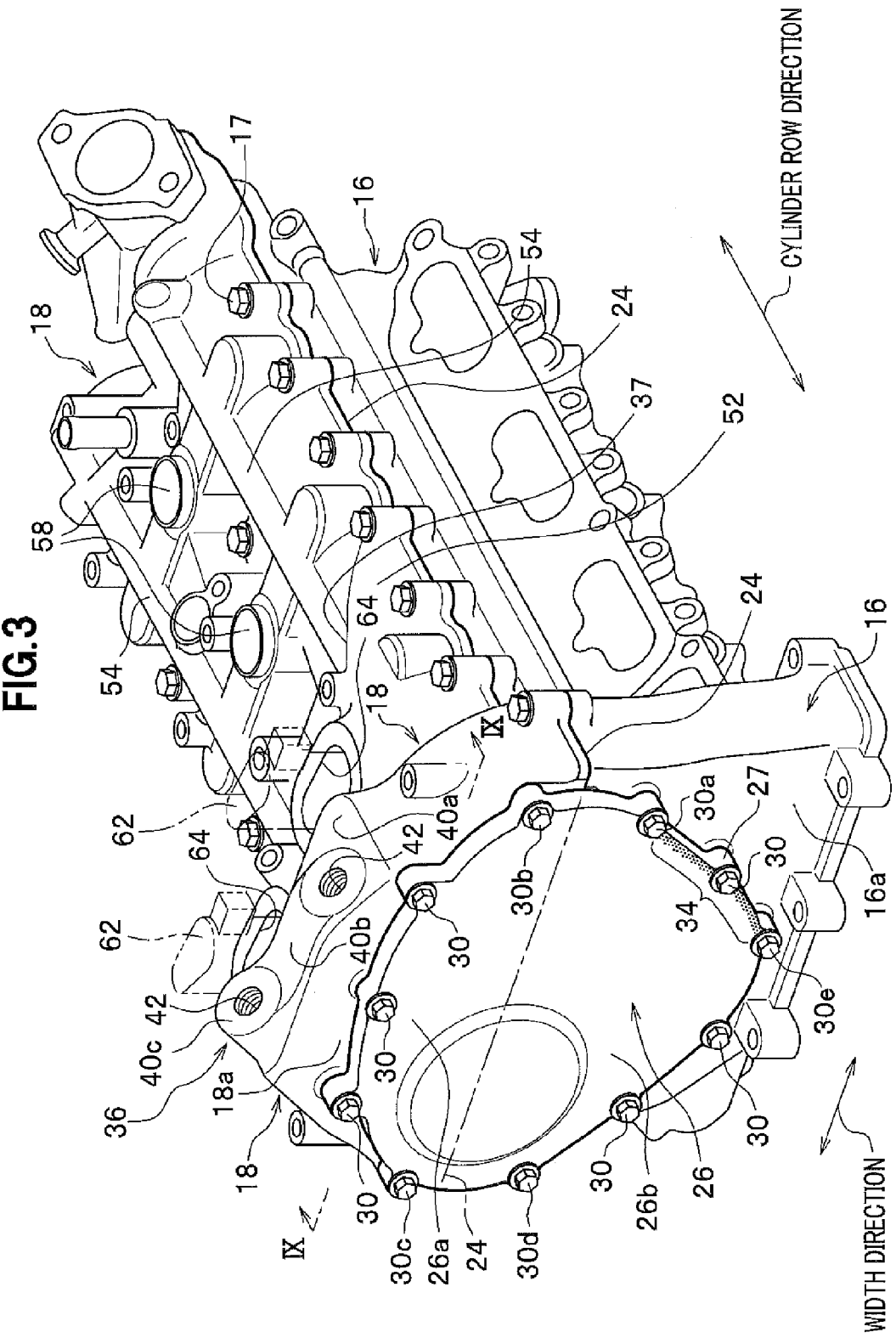
FIG. 3 is an enlarged perspective view of a right bank including the cover member.
Figure 4:
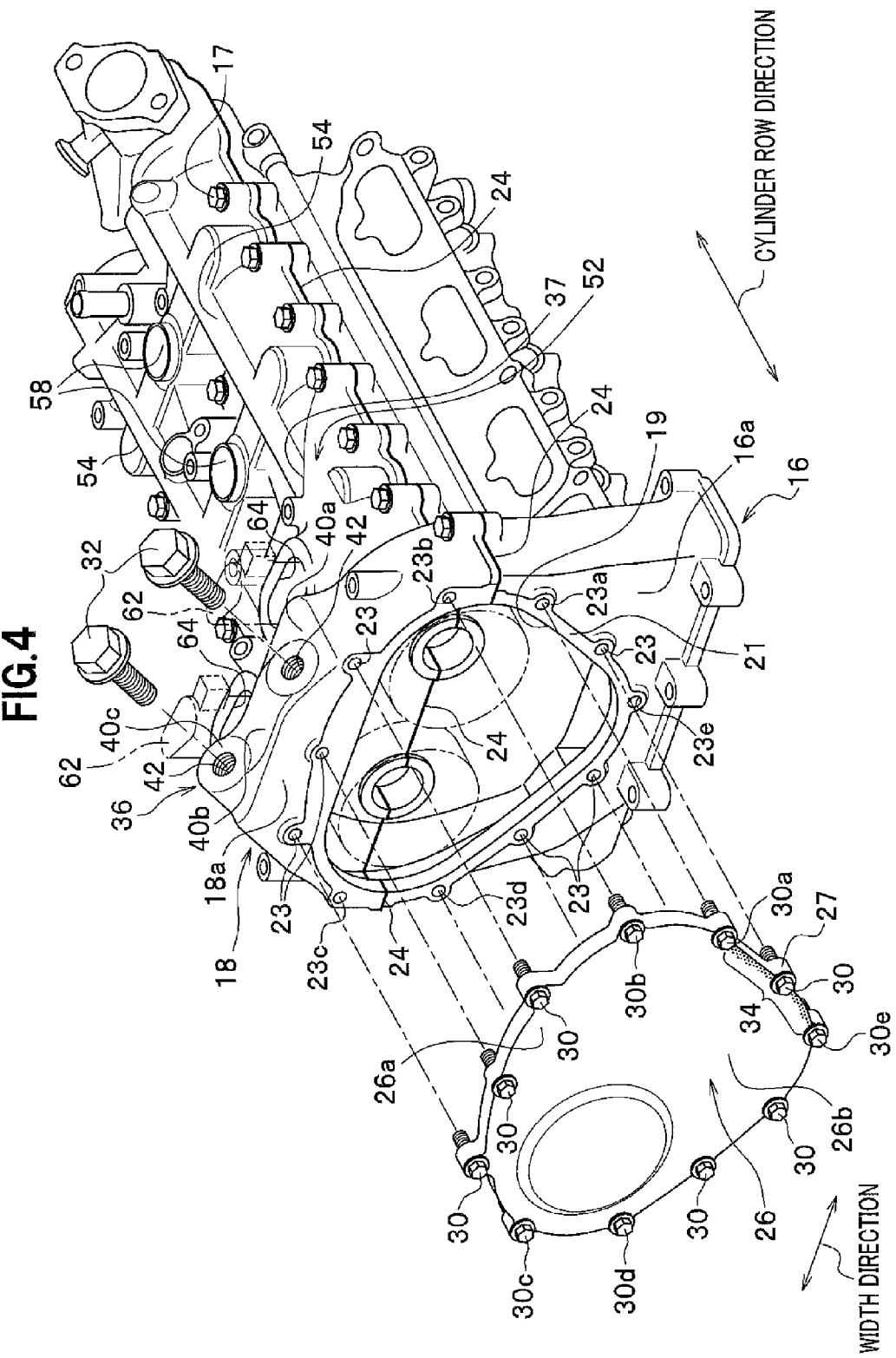
FIG. 4 is an exploded perspective view of the right bank which is removed of the cover member from the state shown in FIG. 3.

Next, an embodiment of the present invention will be described in detail with appropriate reference to accompanying drawings. FIG. 1 is a front view of a V-type engine which is applied with a head cover structure and a cover mounting structure according to the embodiment of the present invention, FIG. 2 is an enlarged partial cross-sectional front view of a head cover and a cylinder head in a state where a part of a cover member is broken, FIG. 3 is an enlarged perspective view of a right bank including the cover member, and FIG. 4 is an exploded perspective view of the right bank which is removed of the cover member from the state shown in FIG. 3.

Note that, "FRONT-REAR" shown by an arrow in each FIG. refers to a front-rear direction of an engine, and one side of the engine, which is provided with a timing train mechanism in the front-rear direction, is referred to as a front side, and further the other side of the engine, which is coupled to a transmission, is referred to as a rear side. "UP-DOWN" refers to an up-down direction of the engine in a vehicle-mounted state, and coincides with an up-down direction of a vehicle (vertical up-down direction). "LEFT-RIGHT" refers to a left-right direction (vehicle width direction) with respect to a forward direction of the vehicle. In addition, the front-rear direction of the engine coincides with a cylinder row direction of the engine. The cylinder row direction coincides with an axial direction (a crankshaft direction) of a crankshaft. Further, since the engine is disposed longitudinally with respect to the vehicle, the front-rear direction of the engine coincides with the front-rear direction of the vehicle. Further, a reference sign A denotes a cylinder axis line (cylinder axis direction), and the reference signs M1, M2 denote mounting brackets, respectively. Furthermore, "WIDTH DIRECTION" shown in FIGS. 3 and 4 refers to a direction perpendicular to a cylinder axis line A and the cylinder row direction at a front end portion in the cylinder row direction.

Figure 2:
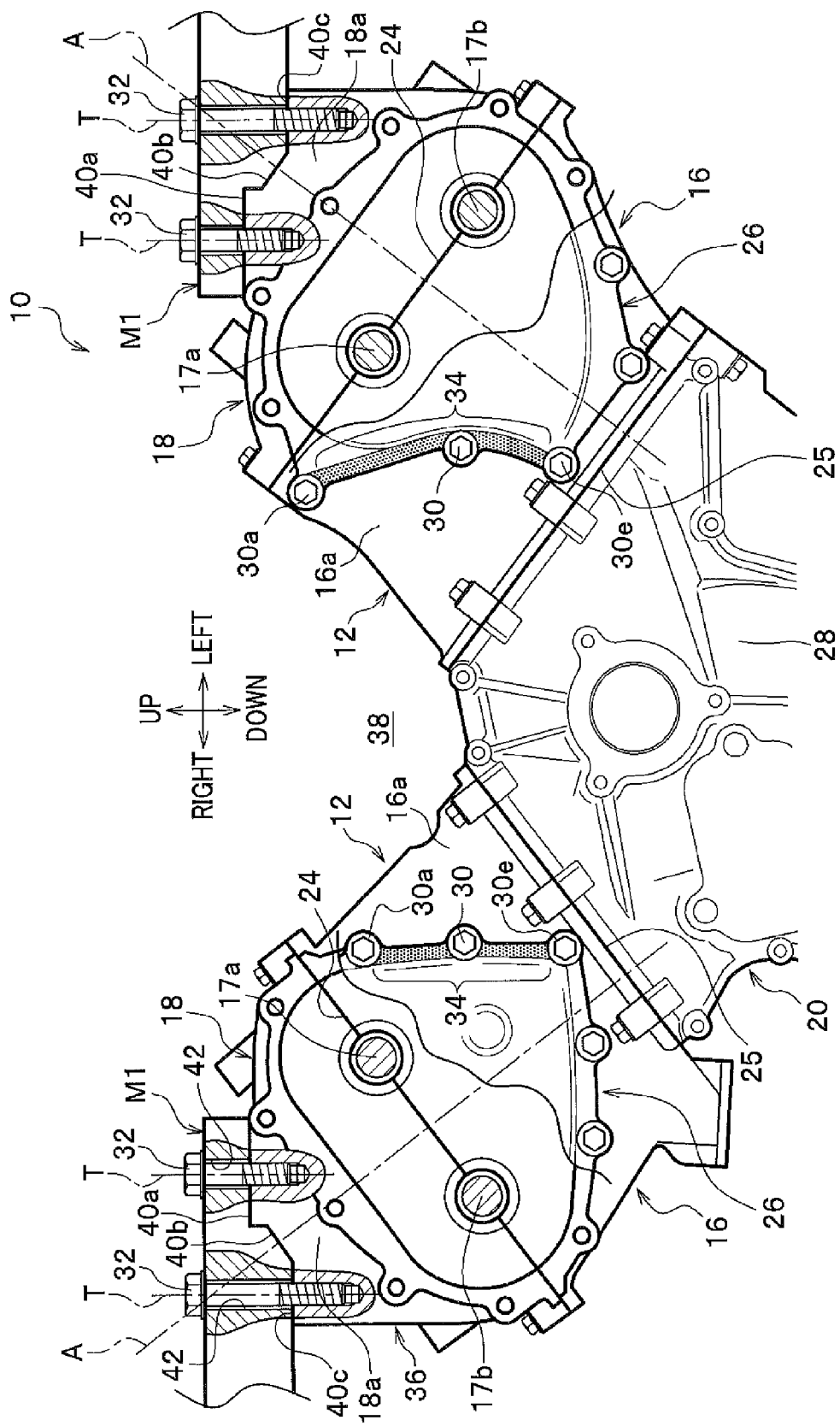
FIG. 2 is an enlarged partial cross-sectional front view of a head cover and a cylinder head in a state where a part of a cover member is broken.

As shown in FIGS. 1 and 2, an engine 10, which is applied with a head cover structure and a cover mounting structure according to the embodiment of the present invention, is composed of a V-type multi-cylinder engine having V-shaped banks 12 on the left and right. In the engine 10, the crankshaft is disposed longitudinally in the front-rear direction of the vehicle. Behind the engine 10, a transmission 14 (see FIGS. 10 to 12), which has a plurality of gear stages (not shown) and serves as a transmission mechanism, is provided.

The engine 10 is configured to include a cylinder head 16, a head cover 18 which is coupled to an upper portion of the cylinder head 16 with bolts 17 and is made of rigid metal (for example, made of aluminum alloy), a cylinder block 20 which is coupled to a lower portion of the cylinder head 16, and a cylinder block lower 22 which is provided on a lower portion of the cylinder block 20. Between the head cover 18 and the cylinder head 16, mating surfaces 24 for integrally coupling a lower surface of the head cover 18 and an upper surface of the cylinder head 16 to each other are provided. The mating surfaces 24 consist of surfaces which are substantially perpendicular to the cylinder axis line A, and are extended in the cylinder row direction (see FIGS. 3 and 4). Note that, each bank has a plurality of cylinders arranged in series, and the "cylinder row direction" refers to a row direction of the plurality of cylinders.

The cylinder block 20 is provided with a crankcase and a cylinder bore (not shown). Inside the cylinder block 20, a crankshaft, connecting rods, pistons, and the like (not shown) are accommodated. Note that, in FIG. 1, a point O denotes a shaft center which is a center of the crankshaft.

The cylinder head 16 constitutes a combustion chamber (not shown) together with the cylinder block 20. Inside the cylinder head 16, an intake port and an exhaust port (not shown) communicating with the combustion chamber are formed, and a valve train, which is composed of such as an intake valve and an exhaust valve (not shown) for opening or closing the intake port and the exhaust port, is provided. Further, as shown in FIG. 2, on an upper side of the cylinder head 16, two camshafts (not shown) composed of an intake camshaft 17a and an exhaust camshaft 17b are disposed. The two camshafts are extended in the front-rear direction of the vehicle, and are arranged in parallel so that shaft center lines thereof are parallel to each other.

On a front edge portion of the engine 10, a pair of cover members 26 provided across both the cylinder head 16 and the head cover 18, and a timing train cover (chain cover) 28 provided on such as the cylinder block 20 and the cylinder block lower 22, are separately provided. A mounting surface 21 of the cover member 26 is located on the front side of the engine relative to the timing train cover 28 (see FIG. 12), while the cover member 26 is located on an upper side in the cylinder axis direction, and the timing train cover 28 is located on a lower side in the cylinder axis direction (see FIG. 1). Note that, since the pair of cover members 26 is formed in substantially the same shape with each other in the left and right, the cover member 26 on RIGHT side in FIG.

1 will be described in detail, and description of the cover member 26 on LEFT side will be omitted.

The timing train cover 28 forms a timing train chamber together with the engine body, and covers a cam timing chain (not shown). The cam timing chain is disposed on one end side in the cylinder row direction of the engine 10, and serves as a driving force transmission mechanism. A rotational driving force of the crankshaft is transmitted to the valve train via the cam timing chain (not shown).

As shown in FIG. 4, on side walls 16a, 18a of front ends of the cylinder head 16 and the head cover 18, an opening portion 19 of substantially inverted triangular shape is formed. The opening portion 19 is formed in combination of an opening of the cylinder head 16 side and an opening of the head cover 18 side at the mating surfaces 24. The opening of the head cover 18 side is located on an upper side of the mating surfaces 24, and is formed in a substantially semi-elliptical shape. The opening of the cylinder head 16 side is located on a lower side of the mating surfaces 24, and is formed in a substantially triangular shape. On a periphery of the opening portion 19, the mounting surface 21, which has a shape surrounding the opening portion 19 and on which the cover member 26 is mounted from a direction described later, is formed. On the mounting surface 21, a plurality of fastening holes (second fastening portions) 23 to which each fastening bolt 30 is fastened are formed apart from each other by a substantially equal distance over an entire circumference thereof. The opening portion 19 is in communication with an upper portion of the timing train chamber which is provided on the front ends of the cylinder head 16 and the head cover 18. Note that, the side walls 16a, 18a have rigidities, because they are not formed in separate bodies from the cylinder head 16 and the head cover 18, but are respectively formed integrally with the cylinder head 16 and the head cover 18. When referring to all of the fastening holes, it is denoted by "fastening holes 23", and when referring to a specific fastening hole, it is denoted by a reference numeral 23 with a suffix of a lowercase letter. Similarly, when referring to all of the fastening bolts, it is denoted by "fastening bolts 30", and when referring to a specific fastening bolt, it is denoted by a reference numeral 30 with a suffix of a lowercase letter.

On upper and lower positions of one end and the other end of the full width in the width direction of the mating surfaces 24, four fastening holes 23a, 23b, 23c, 23d are respectively provided. By fastening four fastening bolts 30a, 30b, 30c, 30d to the four fastening holes 23a, 23b, 23c, 23d, the cover member 26 is fixed to the cylinder head 16 and the head cover 18. In other words, the four fastening holes 23a, 23b, 23c, 23d are arranged closest to the mating surfaces 24 among the plural fastening holes 23, and the four fastening holes 23a, 23b, 23c, 23d are located outermost from the cylinder axis line A in a direction (in WIDTH DIRECTION shown in FIGS. 3 and 4) perpendicular to a cylinder axis line A direction, to be provided on the upper and lower positions of the mating surfaces 24. Note that, as shown in FIG. 1, a portion on a side of the mating surfaces 25 of the cylinder head 16 and the cylinder block 20 (on the lower side) in a side wall 16a of the front end of the cylinder head 16, is coupled (fastened) to the timing train cover 28 at the mating surfaces 25 with the timing train cover 28, in the width direction substantially perpendicular to the cylinder axis line A direction.

As shown in FIGS. 3 and 4, the cover member 26 is made of a flat metallic plate of substantially inverted triangular shape, and is formed in a shape corresponding to the opening portion 19 so as to close the opening portion 19. On an outer peripheral edge portion of the cover member 26, curved portions 27, which are spaced from each other in a circumferential direction and project radially outwardly, are formed. The curved portions 27 are provided in plurality at substantially equal intervals in the circumferential direction. Each curved portion 27 is formed with a through-hole, which passes through the cover member 26, and through which the fastening bolt 30 is inserted.

The cover member 26 is configured integrally with a head cover covering portion 26a fastened to the head cover 18 and a cylinder head covering portion 26b fastened to the cylinder head 16 at a boundary of the mating surfaces 24 (see FIGS. 3 and 4). When viewed from the front, the head cover covering portion 26a has a substantially semi-elliptical shape, and the cylinder head covering portion 26b has a substantially triangular shape, and then the cover member 26 is formed in a shape integrated with the both shapes.

The cover member 26 is fastened across the mating surfaces 24 of the cylinder head 16 and the head cover 18 (see FIG. 3). Further, as shown in FIG. 4, the cover member 26 is mounted on the mounting surface 21, for example, with the fastening bolts (second fastening members) 30 such as a hexagonal bolt, from a direction perpendicular to the mating surfaces 24 of the cylinder head 16 and the head cover 18. Further, the cover member 26 has a width dimension W2 substantially equal to the full width W1 of the mating surfaces 24 (see FIG. 1). The full width W1 of the mating surfaces 24 is equal to the full width of the side walls 16a, 18a on the front ends of the cylinder head 16 and the head cover 18.

Further, as shown in FIG. 2, a peripheral edge of the cover member 26 has an edge 34 which is substantially parallel to an axial direction T of fastening bolts 32 for fixing a mounting bracket M1 to the head cover 18. In other words, the edge 34 which is a part of the peripheral edge of the cover member 26 is formed in the axial direction T of the fastening bolts 32. The edge 34 is composed of a substantially straight line (see halftone dot part) connecting a center of a fastening bolt 30a on the upper side and a center of a fastening bolt 30e on the lower side among the plurality of fastening bolts 30 for fastening the cover member 26 (see FIGS. 3 and 4). On the mounting surface 21 corresponding to the edge 34 of the cover member 26, the plurality of fastening holes 23a, 23, 23e (see FIG. 4) or preferably three or more fastening holes 23 are provided. Note that, as shown in FIG. 2, the edge 34 which is the part of the peripheral edge of the cover member 26 provided on the left bank 12 is formed in the axial direction T of the fastening bolts 32, and the same effect as the right bank 12 is obtained.

Furthermore, as shown in FIG. 1, a lower end of the cover member 26 in the cylinder axis line A direction is located higher than the mating surfaces 25 of the cylinder head 16 and the cylinder block 20. That is, a lower end portion of the cover member 26 does not cover a front surface of the cylinder block 20. The lower end of the cover member 26 in the cylinder axis line A direction does not reach the cylinder block 20, but is delimited by the lower portion of the cylinder head 16 in the cylinder axis line A direction. Note that, in the present embodiment, the hexagonal bolts formed with hexagonal head portions are shown as the fastening bolts 32, however, they are not limited thereto, stud bolts not provided with head portions may be used.

Figure 5:
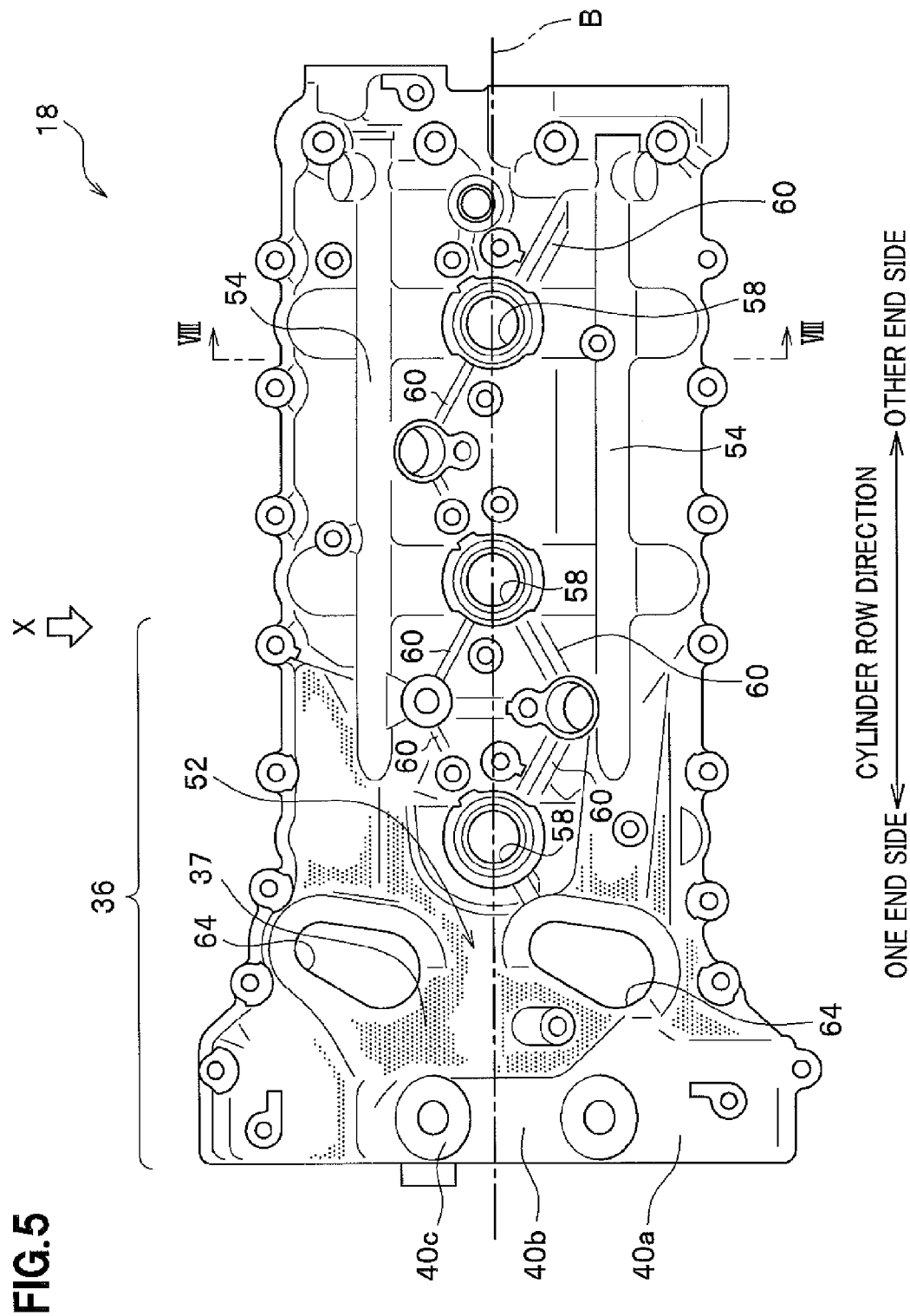
FIG. 5 is a plan view of the head cover shown in FIG. 4.
Figure 9:
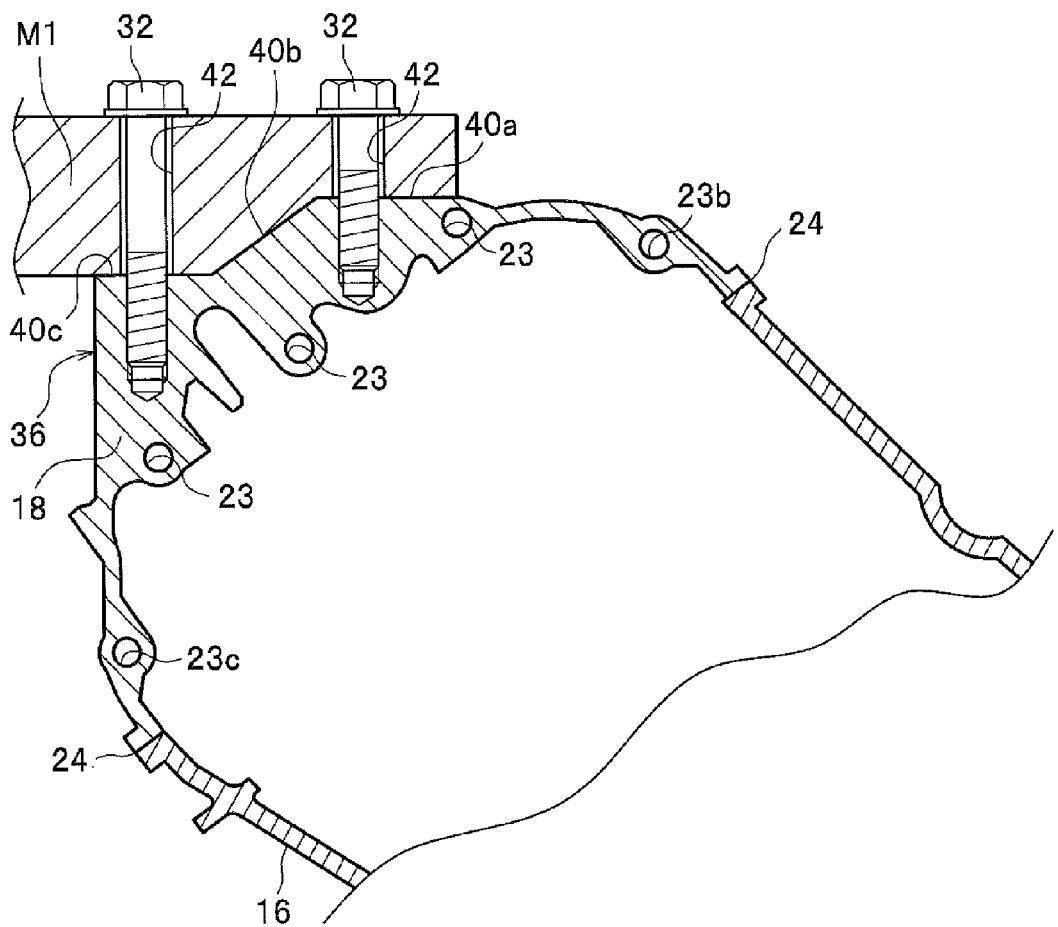
FIG. 9 is an enlarged cross-sectional view taken along a line IX-IX in FIG. 3.

As shown in FIGS. 3, 4 and 5, the head cover 18 is provided with a bulging portion 36, which is located on an upper portion of the front end thereof (on the upper portion of the timing train chamber) and protrudes upward more than a general portion located on a rear side in the cylinder row direction, and an inclined surface 37, which is continuous with the bulging portion 36 and is inclined downwardly toward the rear side in the cylinder row direction from the bulging portion 36. As shown in FIG. 9, the pair of bulging portions 36 is formed with a height dimension larger than that of other portions of the head cover 18, and the head cover 18 has rigidity and strength which are increased by the pair of bulging portions 36 and the inclined surfaces 37.

As shown in FIG. 2 viewed from the front side of the vehicle, the bulging portion 36 includes a first flat surface 40a which is located on a valley portion 38 side between the left and right banks 12, 12 and over a location between the intake and exhaust camshafts 17a, 17b, an inclined surface 40b which is inclined downwardly outwardly in the left-right direction from the first flat surface 40a, and a second flat surface 40c which is located at a position lower than the first flat surface 40a in the up-down direction and extends outwardly in the left-right direction from the inclined surface 40b.

The first flat surface 40a and the second flat surface 40c are formed with threaded-holes 42 into which threaded-portions of the fastening bolts 32 are screwed. One end portion of the mounting bracket M1 (an engine mounting portion) is fastened to the head cover 18 via the fastening bolts 32 which are screwed into the threaded-holes 42 of the first flat surface 40a and the second flat surface 40c. The other end portion of the mounting bracket M1 is fastened to a vehicle body frame 46a via a vibration isolator 44a (see FIG. 10).

It is configured such that a fastening direction of the fastening bolts (first fastening members) 32 for fastening the mounting bracket M1 to the head cover 18 downwardly from the upper side, and a fastening direction of the fastening bolts (second fastening members) 30 for fastening the cover member 26 to the cylinder head 16 and the head cover 18 in a horizontal direction or in the cylinder row direction, are substantially perpendicular to each other.

Further, as shown in FIG. 1 with reference to FIG. 2, the two fastening bolts 32 for fastening the mounting bracket M1 to the head cover 18 are provided spaced from each other in a direction intersecting the cylinder row direction, and the two fastening bolts 30c, 30d among the plurality of fastening bolts 30 for fastening the cover member 26 to the cylinder head 16 and the head cover 18 are provided so as to be located in a range between axis lines T, T of the pair of fastening bolts 32 adjacent to each other.

Figure 6:
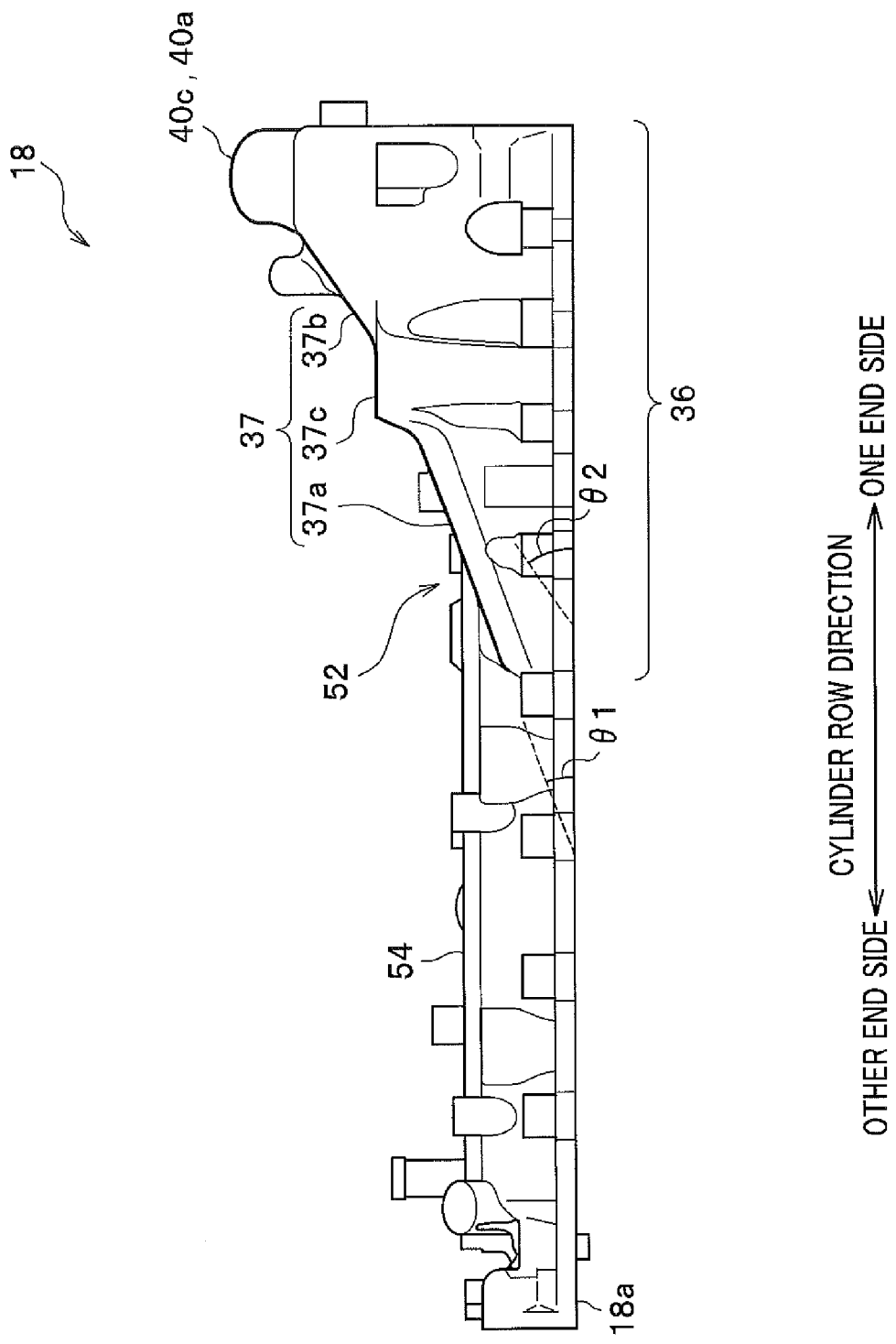
FIG. 6 is a side view of the head cover seen from a direction of an arrow X in FIG. 5.
Figure 7:
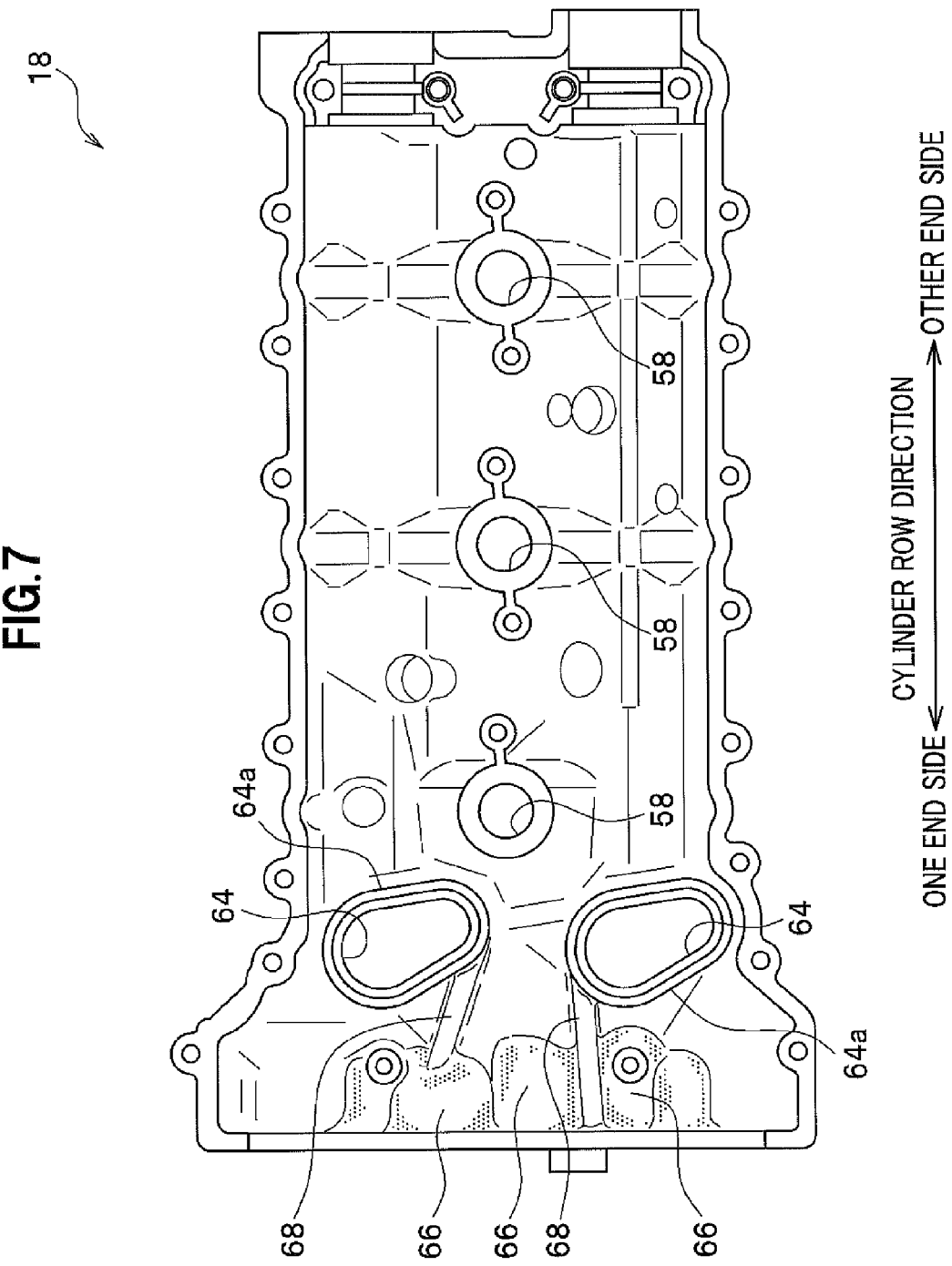
FIG. 7 is a bottom view of the head cover shown in FIG. 5.
Figure 8:
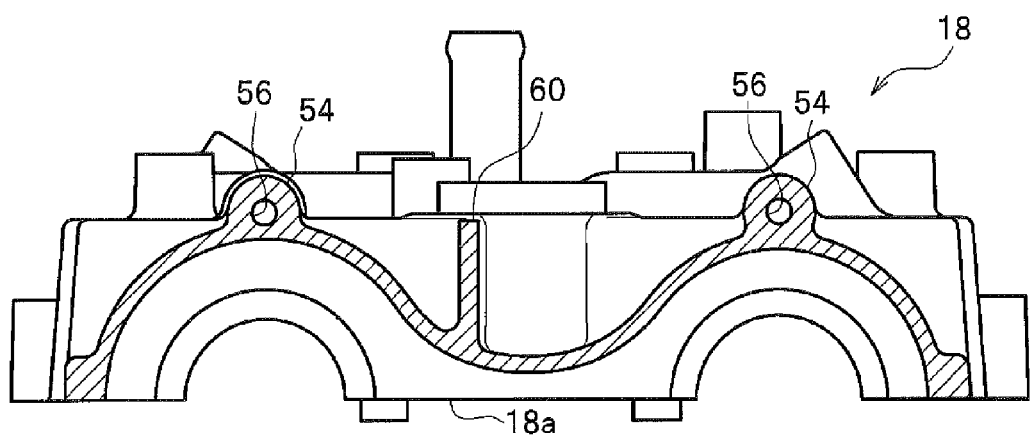
FIG. 8 is an enlarged cross-sectional view taken along a line VIII-VIII in FIG. 5.

With further reference to FIGS. 5 to 9, a structure of the head cover 18 will be described in detail. FIG. 5 is a plan view of the head cover shown in FIG. 4, FIG. 6 is a side view of the head cover seen from a direction of an arrow X in FIG. 5, FIG. 7 is a bottom view of the head cover shown in FIG. 5, FIG. 8 is an enlarged cross-sectional view taken along a line VIII-VIII in FIG. 5, and FIG. 9 is an enlarged cross-sectional view taken along a line IX-IX in FIG. 3.

As shown in FIG. 5, on the one end side in the cylinder row direction of the head cover 18, the bulging portion 36 for covering an upper portion of the driving force transmission mechanism (not shown) is provided. On an upper surface of the bulging portion 36, an inclined surface portion 52 having the inclined surface 37 which is inclined downwardly toward the other end side in the cylinder row direction is provided.

As shown in FIG. 6, the inclined surface 37 is formed so as to rise upwardly from an intermediate position in the cylinder row direction of the head cover 18, to be continuous with the first flat surface 40a and the second flat surface 40c of the bulging portion 36 at the one end side in the cylinder row direction. Note that, the first flat surface 40a and the second flat surface 40c of the bulging portion 36 respectively serve as a top surface and a first fastening portion.

Note that, the inclined surface 37 is composed of a first inclined surface 37a with a tilt angle θ1 with respect to a lower surface 18a of the head cover 18, a second inclined surface 37b with a tilt angle θ2 with respect to the lower surface 18a, and a substantially flat surface 37c which is interposed between the first inclined surface 37a and the second inclined surface 37b. By interposing the substantially flat surface 37c between the first inclined surface 37a and the second inclined surface 37b, the tilt angles θ1, θ2 of the first inclined surface 37a and the second inclined surface 37b can be easily set to be different from each other. Note that, the tilt angles θ1, θ2 of the first inclined surface 37a and the second inclined surface 37b may be set to be equal or substantially equal to each other.

It is preferred that the intermediate position where the inclined surface 37 rises in the cylinder row direction of the head cover 18 is a position closer to the one end side than a middle position between the one end side and the other end side in the cylinder row direction of the head cover 18. Further, the tilt angles θ1, θ2 of the first inclined surface 37a and the second inclined surface 37b are preferably set such that components in a vertically downward direction of a mount input load, which are respectively received by the first flat surface 40a and the second flat surface 40c of the bulging portion 36, are maximized.

Further, as shown in FIG. 5, the head cover 18 is formed with a pair of first ribs 54 extending in the cylinder row direction in plan view. The pair of first ribs 54 extends linearly in parallel to each other. One end side of the pair of first ribs 54 is formed continuously with the bulging portion 36.

Further, as shown in FIG. 8, inside the pair of first ribs 54, hollow oil passages 56 which are sealed at the one end side in the cylinder row direction are formed. By dropping or discharging lubricating oil through a plurality of small holes (not shown) communicating with the oil passage 56, it is possible to improve lubricating properties of the intake cam shaft 17a and the exhaust cam shaft 17b which are provided on the upper side of the cylinder head 16.

Furthermore, returning to FIG. 5, the head cover 18 is formed with three openings 58 for inserting ignition plugs (not shown) which pass through front and rear surfaces of the head cover 18 to be held by the cylinder head 16, and is provided with second ribs 60 for coupling together the three openings 58 in the cylinder row direction. The second ribs 60 are arranged in inclined states to intersect an axis line B of the head cover 18 in plan view (see FIG. 5), and are formed of vertical walls projecting upward in a cross-sectional view (see FIG. 8).

The bulging portion 36 is formed with a pair of openings (through-holes) 64 through which oil control valves (hereinafter referred to as OCVs) 62 are inserted (see FIGS. 3 and 4). The pair of openings 64 has substantially elliptical shapes in plan view, and is disposed spaced from each other by a predetermined distance in a direction perpendicular to the cylinder row direction.

The OCV 62 is mounted on a cam holder (not shown) which is fastened to the cylinder head 16. The cam holder (not shown) is formed in a separate body from the cylinder head 16. The OCV 62 is provided without contacting with an inner peripheral edge of the opening 64, and such that a part thereof is exposed to the outside from the opening 64. Since the OCV 62 is mounted on (supported by) the cam holder on the cylinder head 16 side, it is configured such that transmission of vibration of the head cover 18 to the OCV 62 is prevented. Note that, the cam holder (not shown), on which the OCV 62 is mounted, is preferably configured to be a separate body from the head cover 18.

As shown in FIG. 7, on the one end side in the cylinder row direction at an inner wall of the head cover 18 facing the cylinder head 16, a plurality of boss portions 66 formed by bulging are provided. The fastening bolts 30 are screwed into the boss portions 66. The head cover 18 is provided with third ribs 68 for coupling the boss portions 66 and peripheral edge portions 64a of the through-holes 64.

Figure 10:
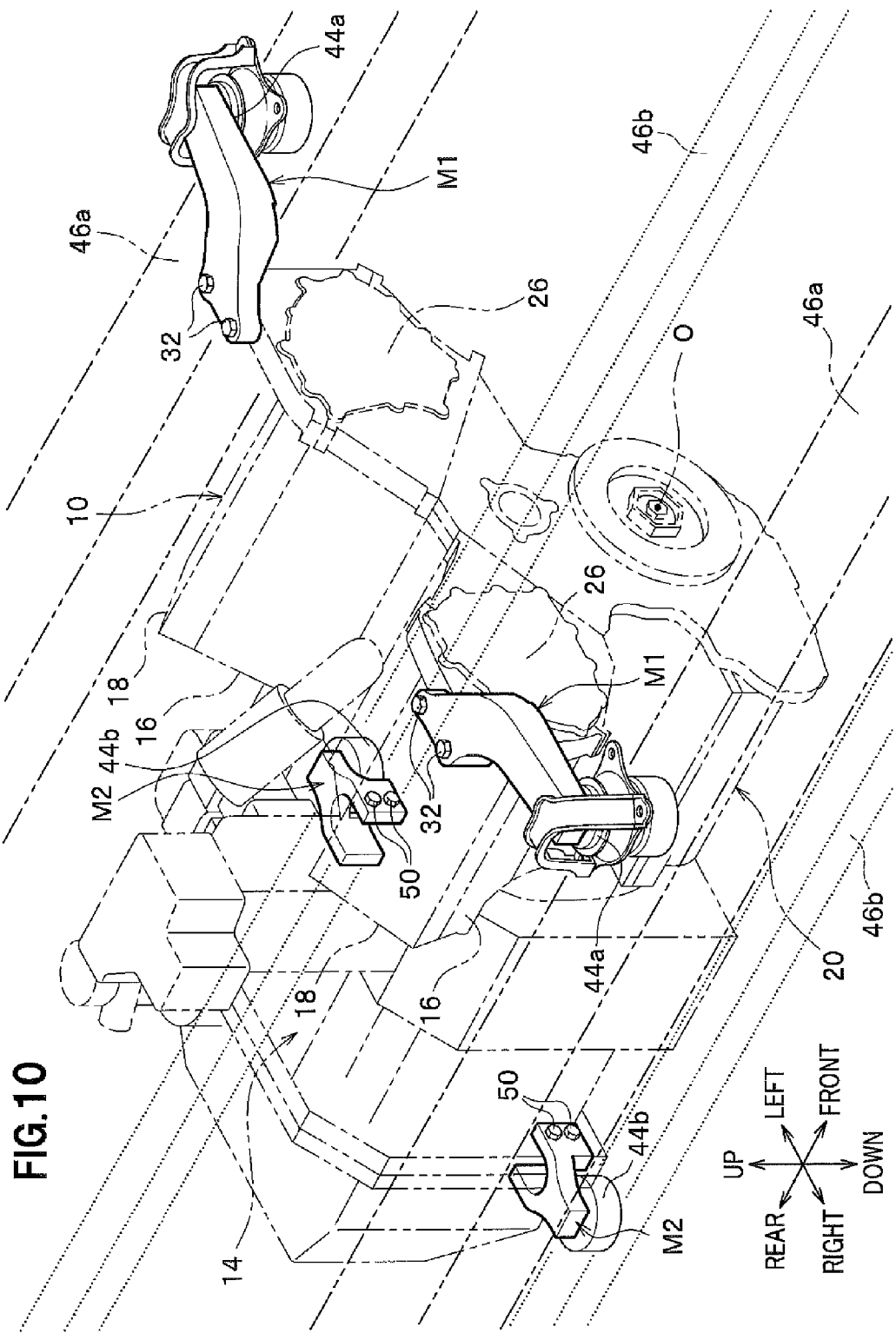
FIG. 10 is a partially virtual perspective view showing a state in which an engine and a transmission are mounted on a vehicle body frame.
Figure 11:
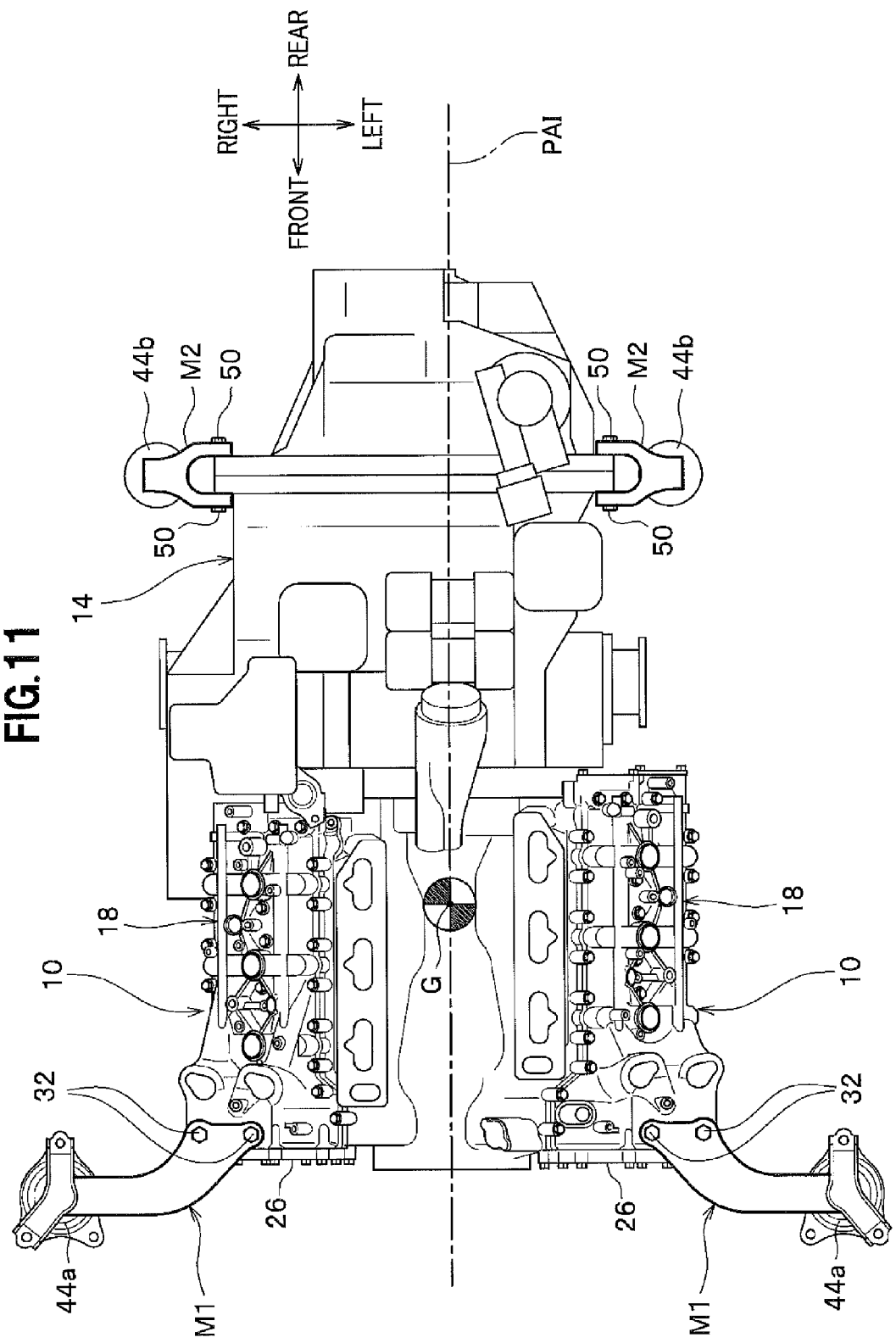
FIG. 11 is a plan view of the engine and the transmission shown in FIG. 10.
Figure 12:
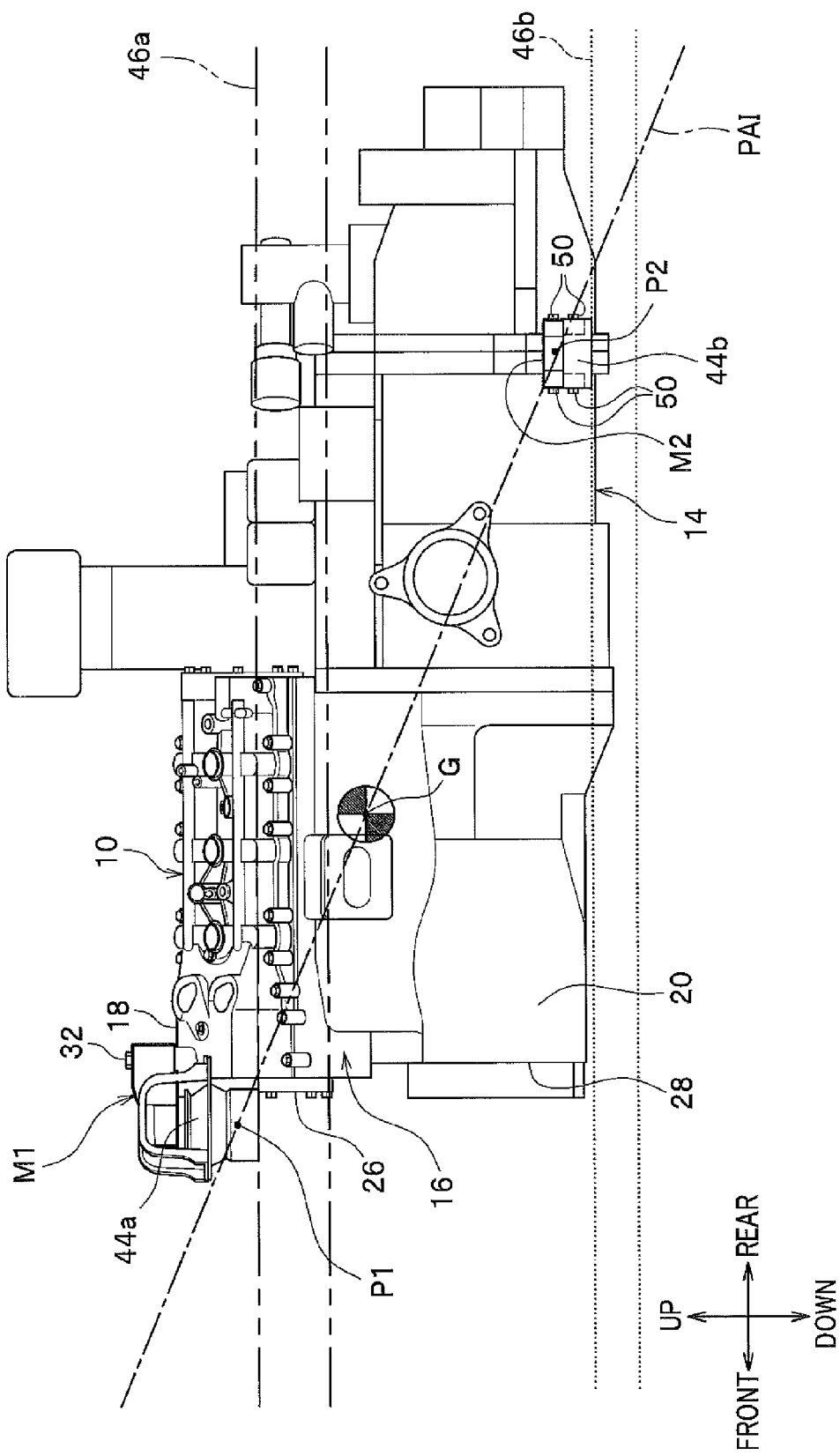
FIG. 12 is a side view of the engine and the transmission shown in FIG. 10.
Figure 13:
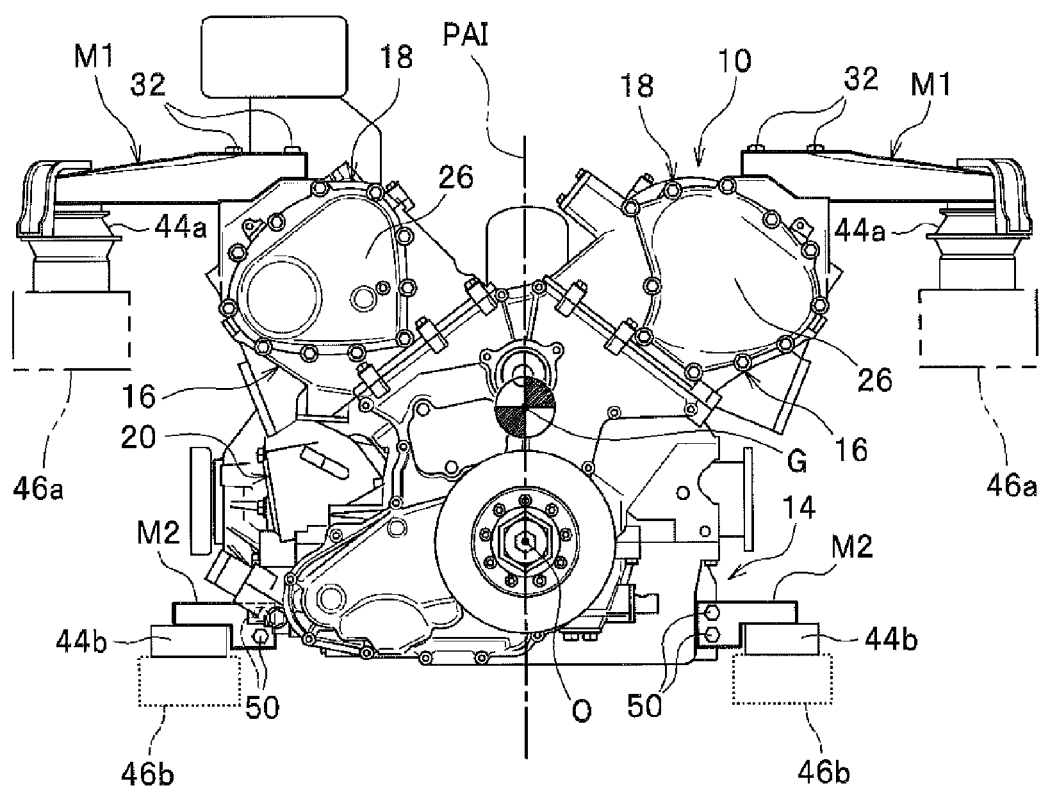
FIG. 13 is a front view of the engine and the transmission shown in FIG. 10.

FIG. 10 is a partially virtual perspective view showing a state in which the engine and the transmission are mounted on the vehicle body frame, FIG. 11 is a plan view of the engine and the transmission shown in FIG. 10, FIG. 12 is a side view of the engine and the transmission shown in FIG. 10, and FIG. 13 is a front view of the engine and the transmission shown in FIG. 10.

Inside the vibration isolator 44a shown in FIG. 10, for example, a cylindrical bush (not shown) made of an elastic body is provided, and the front side of the engine 10 is floated and supported by the bush. Note that, the vibration isolator 44a is preferably a liquid sealed type active vibration isolator. In this manner, the front side in the vehicle front-rear direction of the engine 10 is suspended and supported via a pair of mounting brackets M1 and the vibration isolators 44a which are fastened to the vehicle body frame 46a (see FIG. 10). Note that, the pair of mounting brackets M1 and the vibration isolators 44a are adapted to function as a first engine mounting portion.

As shown in FIGS. 10 to 13, on the transmission 14 which is provided in a linked manner on a vehicle rear side of the engine 10, via fastening bolts 50, a pair of mounting brackets M2 is mounted, on both the left and right sides in the vehicle width direction at lower rear end portions of the vehicle. The pair of mounting brackets M2 is, for example, floated and supported by vehicle body frames 46b via vibration isolators 44b having cylindrical bushes (not shown). Note that, the pair of mounting brackets M2 and the vibration isolators 44b are adapted to function as a second engine mounting portion.

The engine 10 is suspended such that the first engine mounting portion (the vibration isolators 44a and the pair of mounting brackets M1 on the front side which are provided on the head cover 18) and the second engine mounting portion (the vibration isolators 44b and the pair of mounting brackets M2 on the rear side which are mounted on the transmission 14) are located on a principal axis of inertia PAI of the engine 10. Note that, the principal axis of inertia PAI is a specific axis having an origin of the gravity center G of the engine 10.

That is, as shown in side view in FIG. 12, a fastening point P1 of the mounting bracket M1 for the head cover 18 is provided on a front side of the principal axis of inertia PAI, and a fastening point P2 of the mounting bracket M2 for the transmission 14 is provided on a rear side of the principal axis of inertia PAI.

In this manner, by arranging the fastening points P1, P2 in the front-rear direction of the engine 10 on the principal axis of inertia PAI, a driving stability can be improved. Further, by considering the principal axis of inertia PAI, it is possible to set a mounting position of the engine 10 in an appropriate position capable of reducing engine vibration.

The engine 10, which is applied with the head cover structure according to the present embodiment, is basically configured as described above, and operation and effects thereof will be described below.

In a case of attaching the vibration isolator 44a and the mounting bracket M1 for supporting the engine 10 to the head cover 18, a vibration during travel of the vehicle, a centrifugal force during turning, a load in the front-rear direction during acceleration or deceleration, and the like are inputted to the head cover 18 from the mounting bracket M1. In comparison with a conventional head cover of simple rectangular shape, in the present embodiment, since the mounting bracket M1 is attached to the bulging portion 36 which projects to cover the driving force transmission mechanism, a rigidity of the bulging portion 36 is relatively high without thickening the head cover. Further, by forming the inclined surface 37 so as to be continuous with the bulging portion 36, a height dimension is gradually increased toward the one end side in the cylinder row direction owing to the inclined surface 37, and thus the entire inclined surface 37 functions as a rib (partially rigid rib). In the present embodiment, in the bulging portion 36 where the mount input load corresponding to a weight of the engine 10 is inputted, the inclined surface 37 forms the partially rigid rib, and thus it is possible to ensure high rigidity against the mount input load from multiple directions.

Further, in the present embodiment, in the bulging portion 36 where the mount input load is inputted, by providing the pair of first ribs 54 extending in the cylinder row direction, it is possible to prevent deformation in the cylinder row direction of the head cover 18, thereby ensuring sealing performance of the head cover 18.

Further, in the present embodiment, by substantially orthogonalizing the fastening direction of the fastening bolts 32 for fastening the mounting bracket M1 to the head cover 18 with respect to the fastening direction of the fastening bolts 30 for fastening the cover member 26 to the cylinder head 16 and the head cover 18, and by providing the fastening holes 23 (mounting surface 21) for fastening the cover member 26 in proximity to the first flat surface 40a and the second flat surface 40c of the bulging portion 36 so that the fastening holes 23 (mounting surface 21) for fastening the cover member 26 are arranged around the first flat surface 40a and the second flat surface 40c of the bulging portion 36, it is possible to partially thicken the head cover (see FIG. 9). As a result, the rigidity of the head cover 18 around the first flat surface 40a and the second flat surface 40c of the bulging portion 36 can be increased. Further, since the threaded-holes 42 (the fastening boss portion of the first fastening portion) for the fastening bolts 32 and the fastening holes 23 (the fastening boss portion of the second fastening portion) for the fastening bolts 30 are formed in directions substantially perpendicular to each other, the rigidity around the first flat surface 40a and the second flat surface 40c of the bulging portion 36 is increased not only in one direction but also in multiple directions. Therefore, it is possible to sufficiently increase the rigidity against loads in multiple directions which are inputted from the mounting bracket M1, while suppressing an increase in engine weight.

In a case where the mounting bracket M1 is attached to the bulging portion 36 of the head cover 18, by the mount input load which is inputted from the mounting bracket M1, a force to separate the mating surfaces 24 (coupling surfaces) of the cylinder head 16 and the head cover 18 from each other, is generated. In the present embodiment, when the mount input load is applied to the mating surfaces 24 of the cylinder head 16 and the head cover 18, since the cover member 26 for covering both the cylinder head 16 and the head cover 18 across the mating surfaces 24 thereof serves as a rigid member, it is possible to suitably avoid that the mating surfaces 24 of the cylinder head 16 and the head cover 18 are separated from each other to generate a gap between the mating surfaces 24.

In other words, since the cover member 26 is fastened across the mating surfaces 24 of the cylinder head 16 and the head cover 18, a force to couple together the mating surfaces 24 of the cylinder head 16 and the head cover 18 is applied so that a coupling state of the mating surfaces 24 can be firmly held.

Further, in the present embodiment, when the mount input load is applied in the range between axis lines T of the pair of fastening bolts 32 adjacent to each other, since the two fastening bolts 30c, 30d for fastening the cover member 26 are provided in the range (see FIG. 1), because of the threaded-holes 42 (the fastening boss portion of the first fastening portion) for the fastening bolts 32 and the fastening holes 23 (the fastening boss portion of the second fastening portion) for the fastening bolts 30, it is possible to increase the rigidity by locally (partially) thickening a thickness of a portion to which the mount input load is inputted. Therefore, it is possible to suppress deformation of the head cover 18, thereby supporting the engine in a stable manner.

Further, in the present embodiment, even in a case where the head cover 18 is formed to have three openings 58 for inserting members such as the ignition plugs, which are inserted through the head cover 18 and are held by the cylinder head 16, the rigidity is not reduced thanks to the second ribs 60 for coupling together the three openings 58 in the cylinder row direction, and a desired rigidity can be ensured.

Further, in the present embodiment, even in a case where the bulging portion 36 for supporting the mounting bracket M1 is formed to have the openings 64 through which the OCVs 62 are inserted, the rigidity is not reduced thanks to the third ribs 68 for coupling together the boss portions 66 and the peripheral edge portions 64a of the openings 64, and the desired rigidity can be ensured.

Furthermore, when the mounting bracket M1 serving as the engine mounting portion is attached to the head cover 18, by the mount input load which is inputted from the mounting bracket M1, a force to separate the mating surfaces 24 (coupling surfaces) of the cylinder head 16 and the head cover 18 from each other is generated. However, in the present embodiment, since the cover member 26 is provided so as to cover both the cylinder head 16 and the head cover 18 across the mating surfaces 24 thereof, the force to couple together the mating surfaces 24 of the cylinder head 16 and the head cover 18 is applied, so that the coupling state of the mating surfaces 24 can be firmly held.

As a result, in the present embodiment, when the mount input load is applied to the mating surfaces 24 of the cylinder head 16 and the head cover 18, since the cover member 26 which is fastened across the mating surfaces 24 of the cylinder head 16 and the head cover 18 serves as the rigid member, it is possible to suitably avoid that the mating surfaces 24 of the cylinder head 16 and the head cover 18 are separated from each other to generate the gap between the mating surfaces 24.

In the case where the mounting bracket M1 serving as the engine mounting portion is attached to the head cover 18, by the load (mount input load) which is inputted from the mounting bracket M1, the force to separate the mating surfaces 24 (coupling surfaces) of the cylinder head 16 and the head cover 18 from each other is generated. However, in the present embodiment, since the cover member 26 is provided so as to cover both the cylinder head 16 and the head cover 18, the force to couple together the mating surfaces 24 of the cylinder head 16 and the head cover 18 is applied, so that the coupling state of the mating surfaces 24 can be firmly held.

As a result, in the present embodiment, when the mount input load is applied to the mating surfaces 24 of the cylinder head 16 and the head cover 18, since the cover member 26 which is provided across both the cylinder head 16 and the head cover 18 serves as the rigid member, it is possible to suitably avoid that the mating surfaces 24 of the cylinder head 16 and the head cover 18, which constitute a part of the engine 10, are separated from each other to generate the gap between the mating surfaces 24.

Further, in the present embodiment, the mounting surface 21 for mounting the cover member 26 to the cylinder head 16 and the head cover 18 is set to be perpendicular to the mating surfaces 24 of the cylinder head 16 and the head cover 18. As a result, in the present embodiment, the mounting surface 21 (coupling surface) of the cylinder head 16 and the head cover 18, on which the cover member 26 is mounted, can be in a direction substantially parallel to the mount input load (a direction along the mount input load), and thus it is possible to suppress opening between the cylinder head 16 and the head cover 18. Further, by mounting the cover member 26 from a direction which is perpendicular to a direction to open the mating surfaces 24, the mounting workability can be improved.

Further, in the present embodiment, by setting the width dimension W2 of the cover member 26 to be substantially equal to the full width W1 of the mating surfaces 24, it is possible to cover the mating surfaces 24 (full width of the mating surfaces 24) from one end to the other end in the width direction thereof, thereby suppressing opening of the mating surfaces 24 in a substantially full range in the width direction of the mating surfaces 24.

Further, in the present embodiment, by setting the width dimension W2 of the cover member 26 to be substantially equal to the full width W1 of the mating surfaces 24, it is possible to allow separation (dispersion) of the fastening points (30a, 30b, 30c, 30d) from one end to the other end of the full width in the width direction of the cover member 26 to prevent the opening by the cover member 26, thereby firmly fixing the cover member 26 to the mounting surfaces 21 of the cylinder head 16 and the head cover 18, and thereby suppressing the opening of the mating surfaces 24. Assuming that the width dimension W2 of the cover member 26 is set to be smaller than the full width W1 of the mating surfaces 24 (W1>W2), it is required to couple together portions of the mating surfaces 24 which are not covered by the cover member 26, for example, with fastening members or the like, and thus the number of components is increased, while there is a possibility that the opening occurs at the portions of the mating surfaces 24 which are not covered with the cover member 26.

Further, in the present embodiment, on the upper and lower positions of one end and the other end of the full width in the width direction of the mating surfaces 24, the fastening bolts 30a, 30b, 30c, 30d for respectively fastening the cover member 26 to the cylinder head 16 and the head cover 18 are provided (see FIG. 4), and thus it is possible to firmly fix the cover member 26 across the full width of the mating surfaces 24 which have a possibility to open.

Further, in the present embodiment, by setting the edge 34 provided on the cover member 26 to be in substantially parallel to an input direction of the mount input load from the mounting bracket M1, it is possible to increase a holding force of the mating surfaces 24 by the cover member 26.

Further, in the present embodiment, since the lower portion of the cylinder head 16 is coupled to the cylinder block 20 via the mating surfaces 25, it is possible to increase the rigidity of the cylinder head 16. By increasing the rigidity of the cylinder head 16, it is possible to suppress deformation of the cylinder block 20 even when the mount input load is inputted to the cylinder block 20.

Further, in the present embodiment, since the lower end of the cover member 26 is located higher than the mating surfaces 25 of the cylinder block 20 and the cylinder head 16, and does not cover the front surface of the cylinder block 20, it is possible to improve a joining accuracy between the cylinder head 16 and the head cover 18, thereby increasing a coupling strength therebetween.

Furthermore, in the present embodiment, since the side walls 16a, 18a provided on the front ends in the cylinder row direction of the cylinder head 16 and the head cover 18 are not formed in separate bodies from the cylinder head 16 and the head cover 18, but are respectively formed integrally with the cylinder head 16 and the head cover 18, they can have rigidity. Further, a lower end of the cylinder head 16 is integrally fastened to an upper end of the cylinder block 20 by fastening means such as bolts, so that a bag-like space portion (upper portion of the timing train chamber) can be formed between the cylinder head 16 and the side wall 16a of the cylinder head 16. In this case, by providing the side wall 16a of the cylinder head 16 for forming the space portion together with the cylinder head 16, it is possible to provide the mating surfaces 25 (fastening surfaces) with the cylinder block 20 (timing train cover 28) on the lower portion of the cylinder head 16.

Note that, the present embodiment is described by use of the cover member 26 provided on the V-type engine, however, the present invention is not limited thereto, but can be, for example, applied to a cover member provided on an in-line engine (not shown).

The invention claimed is:

1. A head cover structure of an engine in which an engine mounting portion for suspending the engine on a vehicle body frame is attached to an upper surface of a head cover for covering a valve train,
   wherein the engine includes a driving force transmission mechanism for transmitting a driving force of a crankshaft to the valve train on one end side in a cylinder row direction,
   wherein on the one end side in the cylinder row direction of the head cover, a bulging portion for covering an upper side of the driving force transmission mechanism is provided,
   wherein the engine mounting portion is attached to the bulging portion,
   wherein the bulging portion is provided with an inclined surface portion having an inclined surface which is inclined downwardly toward the other end side in the cylinder row direction,
   wherein the inclined surface is formed to rise upwardly from an intermediate position in the cylinder row direction so as to be continuous with a top surface of the bulging portion on the one end side in the cylinder row direction, and
   wherein an opening portion is formed on a side wall on the one end side in the cylinder row direction of the bulging portion, a cover member for closing the opening portion is provided, a part of the cover member is fastened to the head cover, and the remainder of the cover member is fastened to a cylinder head, the bulging portion of the head cover is provided with a first fastening portion for fastening the engine mounting portion to the head cover, the bulging portion of the head cover is further provided with a second fastening portion for fastening the cover member to the head cover, and a fastening direction of the first fastening portion and a fastening direction of the second fastening portion are substantially perpendicular to each other.

2. The head cover structure of the engine according to claim 1,
   wherein the head cover is formed with a rib extending in the cylinder row direction, and
   wherein one end side of the rib is continuous with the bulging portion.

3. The head cover structure of the engine according to claim 1,
   wherein the cover member includes a head cover covering portion which is fastened to the head cover, and a cylinder head covering portion which is fastened to the cylinder head, and
   wherein the cover member is fastened across mating surfaces of the cylinder head and the head cover.

4. The head cover structure of the engine according to claim 1,
   wherein a plurality of first fastening members which are fastened to the first fastening portion are provided apart from each other in a direction intersecting the cylinder row direction, and
   wherein at least one second fastening member which is fastened to the second fastening portion is located in a range between axis lines of the first fastening members adjacent to each other.

5. The head cover structure of the engine according to claim 4,
   wherein the bulging portion is formed with a through-hole through which an oil control valve is inserted,
   wherein on one end portion in the cylinder row direction of the bulging portion, a boss portion for fastening the first fastening member and/or the second fastening member is formed to bulge out inside the head cover, and
   wherein on an inner surface of the head cover, a rib for coupling the boss portion and a peripheral edge portion of the through-hole is provided.

6. The head cover structure of the engine according to claim 1,
   wherein the head cover is formed with at least two openings for inserting members which are held through the head cover, and
   wherein the head cover is provided with a rib for coupling at least the two openings in the cylinder row direction.

* * * * *